United States Patent [19]

Williams et al.

[11] Patent Number: 5,159,847

[45] Date of Patent: Nov. 3, 1992

[54] SECTOR PLATE FOR TRANSFER CASE

[75] Inventors: Randolph C. Williams, Weedsport; Arthur Bouchard, II, Cazenovia, both of N.Y.

[73] Assignee: New Venture Gear, Inc., Troy, Mich.

[21] Appl. No.: 758,588

[22] Filed: Sep. 12, 1991

[51] Int. Cl.⁵ .................... F16H 59/10; B60K 17/354; B60K 23/08
[52] U.S. Cl. .................................... 74/337.5; 74/107; 74/473 R; 74/475; 74/516; 180/247; 192/93 R
[58] Field of Search .................. 74/473 R, 475, 337.5, 74/104, 107, 569, 516, 518; 180/247, 249, 250; 192/93 R; 251/251

[56] References Cited

U.S. PATENT DOCUMENTS

| | | | |
|---|---|---|---|
| 2,772,652 | 12/1956 | Shane et al. | 74/337.5 |
| 2,905,433 | 9/1959 | Till et al. | 74/107 X |
| 3,700,083 | 10/1972 | Ashikawa et al. | 192/53 F |
| 4,381,828 | 5/1983 | Lunn et al. | 180/247 |
| 4,531,423 | 7/1985 | Fogelberg | 180/247 X |
| 4,704,917 | 11/1987 | Hiroyasu | 74/473 R |
| 4,770,280 | 9/1988 | Frost | 192/109 A |
| 4,782,714 | 11/1988 | Schletzbaum et al. | 74/337.5 |
| 5,076,112 | 12/1991 | Williams | 74/337.5 |

FOREIGN PATENT DOCUMENTS

356 9/1936 United Kingdom ................ 251/251

*Primary Examiner*—Allan D. Herrmann
*Attorney, Agent, or Firm*—Harness, Dickey & Pierce

[57] ABSTRACT

A shift apparatus for shifting a transfer case between a High-Range operating mode and a Low-Range operating mode. The shift apparatus includes a sector plate supported within the transfer case for rotation about an axis. A range pin member extends into a range slot formed in the sector plate. The range pin member is adapted to move a first shift fork in response to selective rotation of the sector plate between first and second positions corresponding to the High-Range operating mode and the Low-Range operating mode of the transfer case. The range slot has a first camming edge provided for moving the range pin and first shift fork toward the first position upon rotation of the sector plate in a first direction, and a second camming edge for moving the range pin and first shift fork toward the second position in response to rotation of the sector plate in a second direction. According to the present invention, the first and second camming edges are dissimilar for causing different axial force characteristics to be exerted on the range pin member during movement thereof between the first and second positions in response to the direction of rotation of the sector plate.

27 Claims, 4 Drawing Sheets

SECTOR PLATE FOR TRANSFER CASE

BACKGROUND OF THE INVENTION

The present invention relates to a shift arrangement for motor vehicle power transfer devices and, more particularly, to an improved sector plate incorporated into a transfer case shift mechanism.

In general, power transfer mechanisms, such as transfer cases, are operatively associated with both manual and automatic transmissions for selectively directing power to the non-driven wheels of a motor vehicle upon shifting from a Two-Wheel drive mode to a Four-Wheel drive mode. Modernly, conventional transfer cases use a synchronizer clutch arrangement in association with a first shift fork mechanism to provide "shift-on-the-fly" Two-Wheel drive to Four-Wheel drive mode shifting. When shifting the transfer case between the Two-Wheel drive and Four-Wheel drive operating modes, selective actuation of a shift lever by the vehicle operator causes corresponding rotation of a sector plate. In particular, a first cam follower or "mode" pin is secured to the first shift fork mechanism for causing axial movement thereof. Typically, the mode pin is biased into engagement with a contoured outer edge surface of the sector plate. As such, the profile of the outer contoured edge causes the mode pin and, in turn, the first shift fork mechanism to be axially moveable between positions defining the Two-Wheel drive mode and the Four-Wheel drive mode in response to rotation of the sector plate.

Most automotive transfer cases are typically equipped with a speed reduction gear assembly or the like for providing "High" and "Low" speed ranges in conjunction with the Two-Wheel drive and Four-Wheel drive operating modes. As such, a second shift fork mechanism is provided for operably shifting components of the speed reduction gear assembly between a High-Range position providing direct drive and a Low-Range position providing reduction ratio drive. Conventionally, a second cam follower or "range" pin is secured to the second shift fork mechanism and extends into a contoured range slot formed in the sector plate. The range slot defines a continuous cam track within which the range pin travels along a common bi-directional pathway. Engagement between the range pin and the continuous cam track causes axial movement of the range pin and, in turn, the second shift fork between the High-Range and Low-Range positions in response to rotation of the sector plate.

One example of a transfer case incorporating a conventional range pin and slot arrangement on a sector plate is shown in the U.S. Pat. No. 4,770,280 issued to Frost on Sep. 13, 1988 and entitled "Snap-Action Arrangement For Transfer Case Synchronizer". The cam track formed by the range slot includes an upper "mode" section and a lower "range" section. Each of the "mode" and "range" sections of the range slot are defined by substantially parallel inner and outer arcuate edges having a common radius that are laterally offset to provide only minimal clearances with the range pin.

In operation, the "mode" section of the range slot is configured to substantially maintain the axial position of the range pin (and the second shift fork mechanism) while permitting rotation of the sector plate between the Two-Wheel drive mode and Four-Wheel drive mode positions. However, the "range" section of the range slot is configured such that engagement between the range pin and one of the inner and outer arcuate edges causes a predetermined amount of axial movement of the range pin and the second shift fork in a first direction upon rotation of the sector plate from the Four-Wheel High-Range position to the Four-Wheel Low-Range operative positions. Likewise, rotation of the sector plate from the Four-Wheel Low-Range position to the Four-Wheel High-Range position causes the engagement between the range pin and the other of the inner and outer arcuate edges which, in turn, generates a predetermined amount of axial movement of the range pin and second shift fork in a second direction. Therefore, the contour of the laterally offset inner and outer arcuate edges associated with the "range" section determines the magnitude of the axially directed forces exerted on the range pin for a given input torque applied to the shift lever. Accordingly, such conventional range shift arrangements having common radius edge profiles define a common bi-directional pathway along which the range pin travels within the "range" section of the range slot during rotation of the sector plate in both directions. As a result, the axial force versus pin displacement characteristics generated in the "range" section are likewise bi-directional for shifting into and out of either range position. Accordingly, while conventional range shift arrangements generally perform satisfactorily, a compromise typically exists between maximizing shift forces and optimizing shift feel.

SUMMARY OF THE INVENTION

It is therefore a basic object of the present invention to provide an improved range shift arrangement utilizing a rotatable sector plate having a "range" section of the range slot formed with a uniquely modified cam track. The modified cam track is configured for causing the range pin to follow a first uni-directional pathway upon shifting into the Four-Wheel High-Range and a second uni-directional pathway upon shifting into the Four-Wheel Low-Range position. The first and second uni-directional pathways are independent and dissimilar so as to provide means for generating distinct axial force versus range pin displacement characteristics upon rotation of the sector plate in each direction.

In accordance with a preferred embodiment, the present invention is directed to an improved sector plate formed with a range slot that is uniquely configured to include a modified "range" section generally defining a "dual" cam track profile. More specifically, the "dual" cam track profile includes first and second laterally offset and non-parallel edge surfaces having surface contours which define the first and second pathways, respectively along which the range pin travels. The first and second laterally offset edge surfaces are individually and distinctly configured to exert maximized axial forces on the range pin when required while minimizing the axial forces exerted during other phases of the range shifting process. Moreover, the axial force versus range pin displacement characteristics generated via engagement between the range pin and the first edge surface upon rotation of the sector plate in a first direction is different from the axial force versus range pin displacement characteristics generated via engagement between the range pin and the second edge surface upon rotation of the sector plate in a second direction. In this manner, utilization of the non-common profiles for each of the first and second edges surfaces permits the designer to manipulate shift characteristics for each specific transfer case application. As such, the vehicle operator is able to exert a relatively constant input force on the shift lever for smoothly advancing the range collar in either axial direction so as to generate very desirable shift efforts.

It is another object of the present invention to provide a transfer case range shift arrangement incorporating the improved sector plate which can be simply installed into virtually all part-time transfer cases for optimizing shift effort without requiring any significant design changes.

BRIEF DESCRIPTION OF THE DRAWINGS

Further objects, features and advantages of the present invention will be apparent from careful consideration of the following written description and the accompanying drawings in which.

DESCRIPTION OF THE PREFERRED EMBODIMENT

Figure 1:
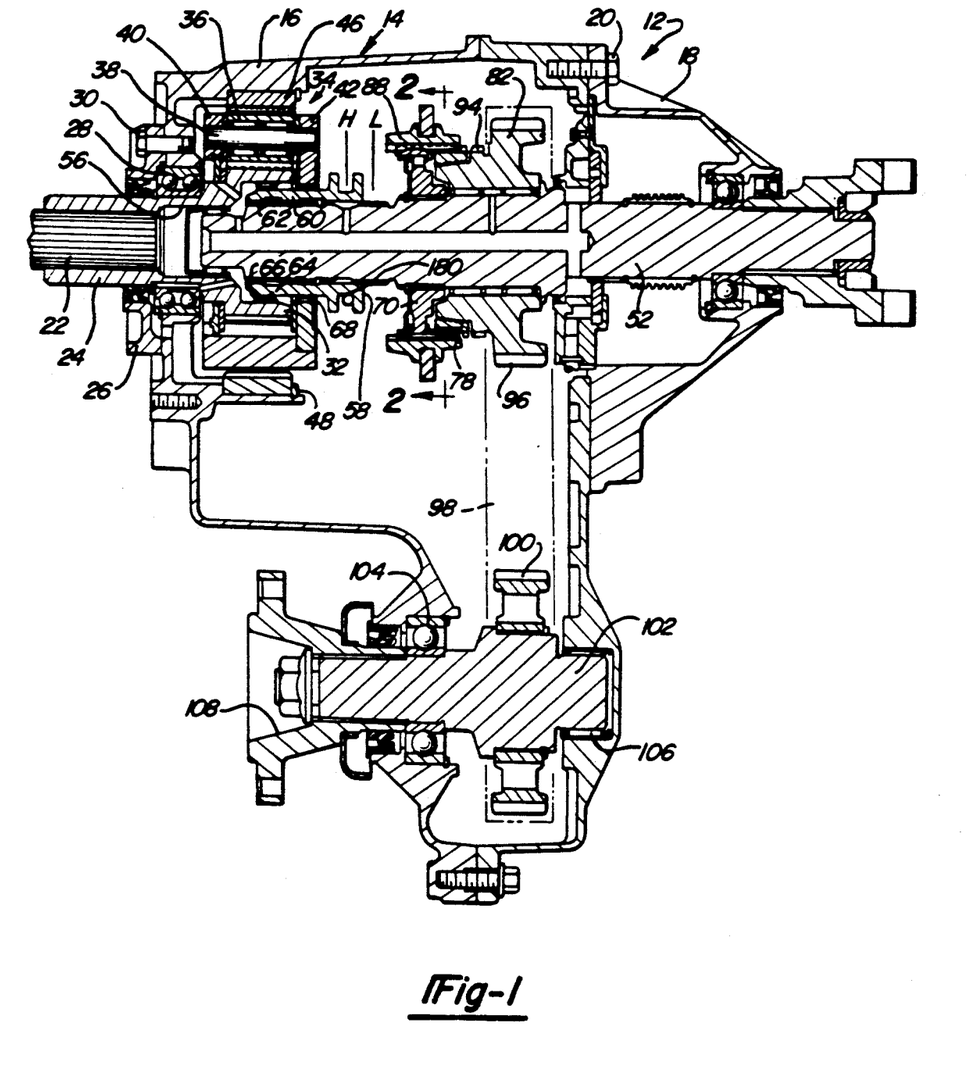
FIG. 1 is a sectional view of an exemplary transfer case adapted for use with the present invention.

Referring now to the drawings, there is shown in FIG. 1 an exemplary transfer case 12 which includes a housing assembly 14 formed by front and back housing sections 16 and 18, respectively, suitably interconnected by a plurality of threaded bolts 20. Front housing section 16 receives a transmission output shaft 22 within an internally splined tubular input stub shaft 24. As is known, transmission output shaft 22 is driven by a power source, such as an external combustion engine (not shown), of a motor vehicle. Input stub shaft 24 is shown rotatably mounted in a collar portion 26 of front housing section 16 by a bearing assembly 28 with collar portion 26 secured by bolts 30 to front housing section 16.

Input stub shaft 24 is provided for transferring power to a speed reduction unit, such as exemplary planetary gear assembly 34, having a "High-Range" direct drive position and a "Low-Range" position providing reduction ratio drive. Planetary gear assembly 34 is shown to include an input sun gear 32 integrally formed on input stub shaft 24. Sun gear 32 is meshed with a plurality of planet gears 36 (one shown). Each planet gear 36 is rotatably journalled on a pin 38 supported in a planetary carrier. The planetary carrier includes fore and aft ring members 40 and 42, respectively, secured by bolts (not shown). Planet gears 36 mesh with a helical annulus gear 46 mounted via a splined press-fit to an inner surface of front housing section 16. Annulus gear 46 is additionally retained against rearward axial movement away from its stop shoulder by a plurality of radially disposed locking tabs 48 each suitably fixed to front housing section 16.

With continued reference to FIG. 1, transfer case 12 includes a first output in the form of a rear axle output or central shaft 52 which is aligned on the longitudinal axis of input stub shaft 24 and has a forward end journalled in an axial bore 56 formed therein. The rearward end of central shaft 52 is adapted for connecting a rear prop shaft (not shown) for driving the rear axle of a motor vehicle. Central shaft 52 has a range collar 58 axially slidable thereon by means of collar internal splines 60 engaged with external splines 62 on central shaft 52. Range collar 58 is formed with external spline teeth 64 shown slidably engaged with sun gear internal spline teeth 66 located in an axial counterbore formed in an aft end of input stub shaft 24. Torque or power flow is transferred directly from input stub shaft 24 to central shaft 52 through engagement of spline teeth 64 and 66 and the engagement of range collar internal splines 60 and central shaft external splines 62 for establishing the direct "High-Range" position indicated by the construction line "H".

Carrier aft ring 42 includes internal spur gear teeth 68 formed concentric with range collar 58 which are placed in sliding meshed engagement with collar external spline teeth 64 upon range collar 58 being slid in an aft direction for defining the "Low-Range" position, as indicated by the construction line "L". If desired, a "neutral" position may be provided between the Four-Wheel High-Range position and the Four-Wheel Low-Range position. In such transfer case applications, when range collar 58 is moved rearwardly a predetermined distance from its High-Range position, its external teeth 64 are disengaged from internal sun gear spline teeth 66 for providing a "neutral" drive range position. Thus, in the "neutral" position no driving torque is transmitted to central shaft 52, whereby no power is supplied to the vehicle's rear wheels.

Figure 2:
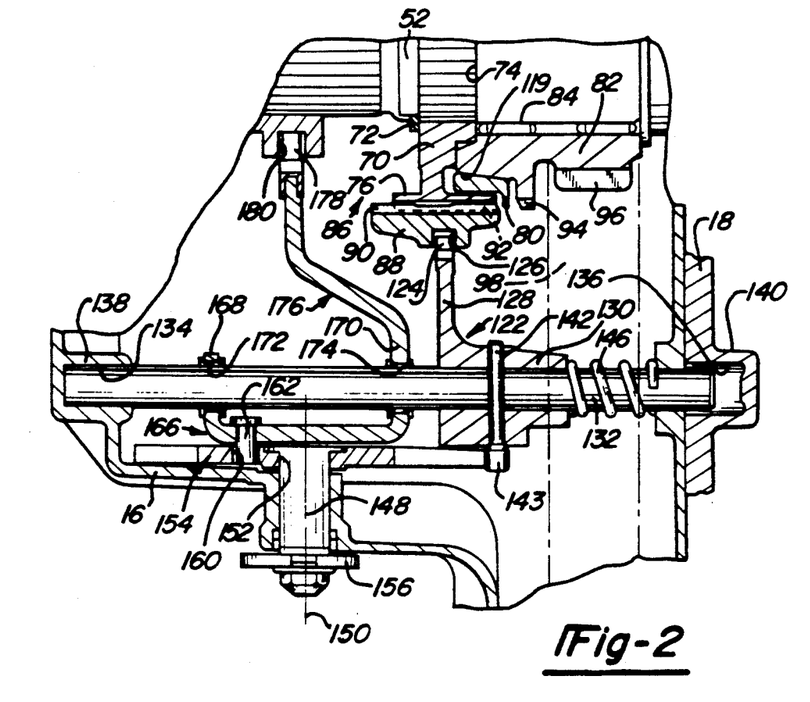
FIG. 2 is a fragmentary view of a transfer case shift arrangement having an improved sector plate constructed in accordance with the present invention.

As best seen in FIGS. 1 and 2, a hub member 70 is splined to central shaft 52 and retained thereon between a snap ring 72 and a radial stop shoulder 74. Hub member 70 has an outer cylindrical rim portion 76 which generally encircles a blocker ring 78 having radially extending external teeth 80 formed at its aft end. In addition, a chain carrier 82 is rotatably journalled by roller bearings 84 on central shaft 52 and can be selectively coupled for rotation with hub member 70 and, in turn, central shaft 52 by a synchronizer apparatus, generally indicated at 86. It is to be understood that virtually any type of transmission synchronizing apparatus can be used. For example, one type of synchronizing apparatus which could be used with the present invention is a "strut" type synchronizer as shown in the aforementioned U.S. Pat. No. 4,770,280 to Frost. Another example of a suitable synchronizing apparatus is disclosed in U.S. Pat. No. 3,700,083 issued Oct. 29, 1972 to N. Ashikawa et al. and which is commonly referred to as "strutless" type synchronizer.

With continued reference to FIGS. 1 and 2, an axially shiftable clutch sleeve 88 of synchronizer apparatus 86 is shown in a central disengaged Two-Wheel High-Range mode position. Clutch sleeve 88 is formed with internal spline teeth 90 which are in constant axial sliding engagement with external spline teeth 92 formed on cylindrical rim portion 76 of hub 70. Thus, clutch sleeve 88 may be axially shifted from the Two-Wheel High-Range drive position toward the Four-Wheel High-Range position to complete lock-up wherein internal spline teeth 90 drivingly engage external spline teeth 94 of chain carrier 82.

As best seen in FIG. 1, chain carrier 82 is formed to include a drive sprocket 96 drivingly engaging a chain, shown in dashed lines at 98, which is coupled to a lower driven sprocket 100. Driven sprocket 100 is, in turn, coupled to a second output which is shown as a forwardly extending front axle output shaft 102. Front output shaft 102 is mounted for rotation within front housing section 16 by a ball bearing assembly 104 and in rear housing section 18 by a roller bearing assembly 106. Front output shaft 102 is suitably connected by a coupling 108 to the motor vehicle's front propeller drive shaft (not shown) for driving the front wheels. Reference may be had to U.S. Pat. No. 4,381,828 issued May 3, 1983, to Lunn et al. for details of a typical transfer case mounting showing its connection to a motor vehicle's front and rear drive axles, the disclosure of the Lunn et al. patent being expressly incorporated by reference herein.

With particular reference now to FIG. 2, a mode fork shift assembly 122 has an arm 128 formed with forked projections 124 engaged in an annular groove 126 formed in clutch sleeve 88. Arm 128 is formed integral with a longitudinally extending tubular section 130. A shift rail 132 is received within tubular section 130 and its opposite ends are suitably supported in fore and aft sockets 134 and 136 respectively, formed in housing assembly 14. More particularly, socket 134 is formed in a boss 138 integral with front housing section 16 while socket 136 is formed in a boss 140 integral with aft housing section 18. Tubular section 130 is fixed for limited axial movement with shift rail by a mode pin 142. Moreover, mode fork shift assembly 122 is normally biased toward the Two-Wheel High-Range drive position by a spring member 146.

A rotatable actuating shaft 148 is supported within the interior of transfer case housing assembly 14 for rotation about its axis 150. A first end of actuating shaft 148 is secured in an aperture 152 formed in a sector plate 154. A shift lever 156 is suitably connected to an opposite end of actuating shaft 148 for rotating actuating shaft 148 and sector plate 154 about axis 150 under the selective control of the vehicle operator. It will be understood that actuating shaft 148 can be rotated in any known manner without departing from the fair scope of the present invention.

Sector plate 154 is also shown to include an elongated contoured slot 160 formed therein and into which a range pin 162 extends. From the exemplary embodiment shown in FIG. 2, it can be seen that range pin 162 is fixedly secured to a base portion of a U-shaped range bracket 166. Range bracket 166 includes a pair of fore and aft flanges 168 and 170, respectively, extending normal to the base portion toward central output shaft 52. Forward flange 168 has an aperture 172 therein sized for slidably receiving shift rail 132. Similarly, range bracket aft flange 170 is provided with an aperture 174 also sized for the reception of shift rail 132. Aft flange 170 has formed integral therewith a range fork shift assembly 176 having forked projections 178 engaged in an annular groove 180 of range clutch collar 58.

Figure 3:
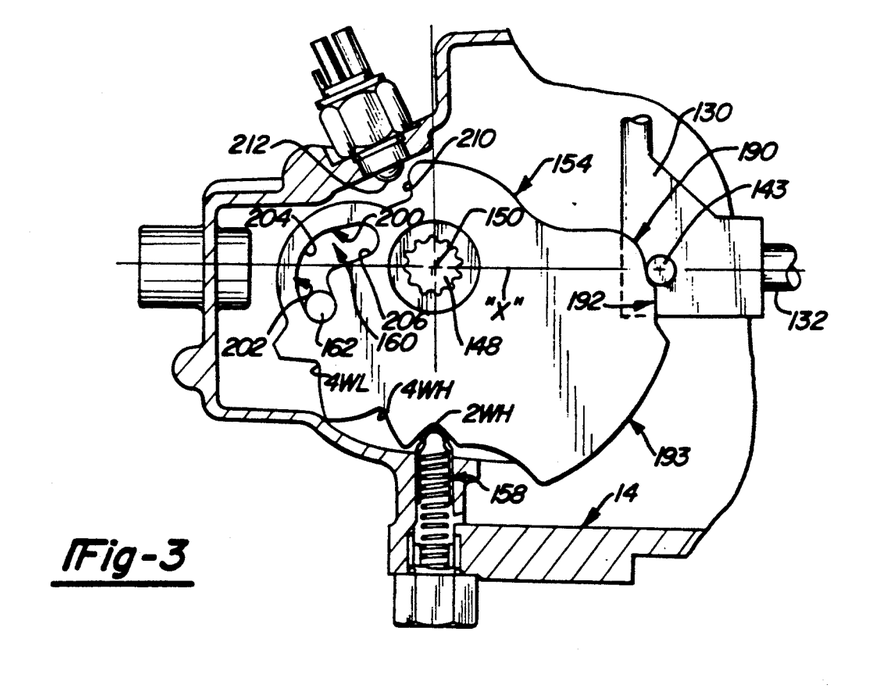
FIG. 3 is a partial side view of FIG. 2 showing the improved sector plate rotated to a Two-Wheel High-Range drive position.
Figure 4:
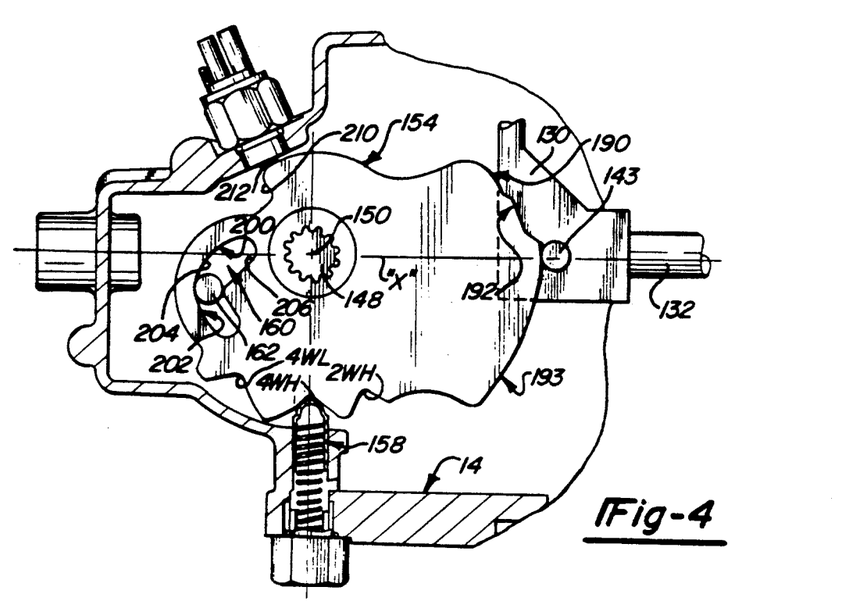
FIG. 4 is a partial side view, similar to FIG. 3, showing the sector plate rotated to a Four-Wheel High-Range drive position.
Figure 5:
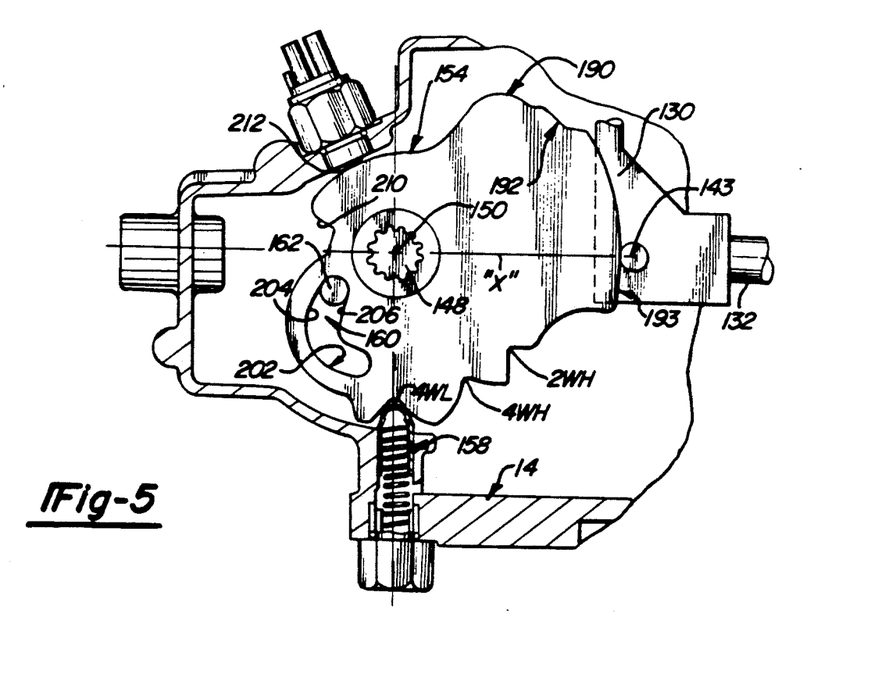
FIG. 5 is a view, similar to FIG. 3, showing the sector plate further rotated to a Four-Wheel Low-Range drive position.

With particular reference now to FIGS. 3 through 5, it can be seen that sector plate 154 may be rotated by actuator shaft 148 to any of three selected operating positions indicated by the three distinct sector notches labeled "2WH", "4WH" and "4WL" each being successively engageable by a spring-biased plunger assembly 158. Sector plate 154 has an outer contoured edge profile shown to define first, second and third surfaces generally designated as 190, 192 and 193, respectively, which are consecutively engageable with a roller 143 on mode pin 142 due to the spring biasing force exerted by spring member 146.

As seen in FIGS. 3 and 4, contact between mode pin roller 143 and first surface 190 defines the Two-Wheel drive High-Range (2WH) position. As sector plate 154 is caused to rotate in a first direction (i.e. counterclockwise in the Drawings) about axis 150, second surface 192 causes axial displacement of mode pin 142, and thus mode fork shift assembly 122 along the longitudinal axis "X" from the Two-Wheel drive High-Range (2WH) position toward the Four-Wheel drive High-Range (4WH) position. As will be appreciated, once in the Four-Wheel High-Range (4WH) position, rotation of sector plate 154 in a second direction (i.e. clockwise) about axis 150 acts to cause axial displacement of mode pin 142 and mode fork shift assembly 122 in the opposite direction for returning transfer case 12 to its Two-Wheel High-Range (2WH) position. In addition, range slot 160 is configured to include a "mode" section 202 operable for generally maintaining range pin 162 and range fork shift assembly 176 in the "High-Range" position during rotation of sector plate 154 between the Two-Wheel High-Range (2WH) and Four-Wheel High-Range (4WH) positions. The specific function of the multi-ramped profile shown associated with second surface 192 is more thoroughly described in U.S. Pat. No. 5,076,112 and entitled "Easy Shift Sector", owned by the common Assignee of the present invention, and which is expressly incorporated by reference herein.

With reference to FIGS. 4 and 5, third surface 193 is shown to define an axial "dwell" position for maintaining mode pin 142 and, in turn, mode fork shift assembly 122 in the Four-Wheel drive mode position upon continued counter-clockwise rotation of sector plate 154. A "dual" cam track profile, formed in association with a "range" section 200 of contoured range slot 160, causes axial movement of range pin 162 and, in turn, range fork shift assembly 176 relative to shift rail 132 for shifting range collar 58 between the Four-Wheel High-Range (4WH) and Four-Wheel Low-Range (4WL) positions in response to selective rotation of sector plate 154.

Figure 6:
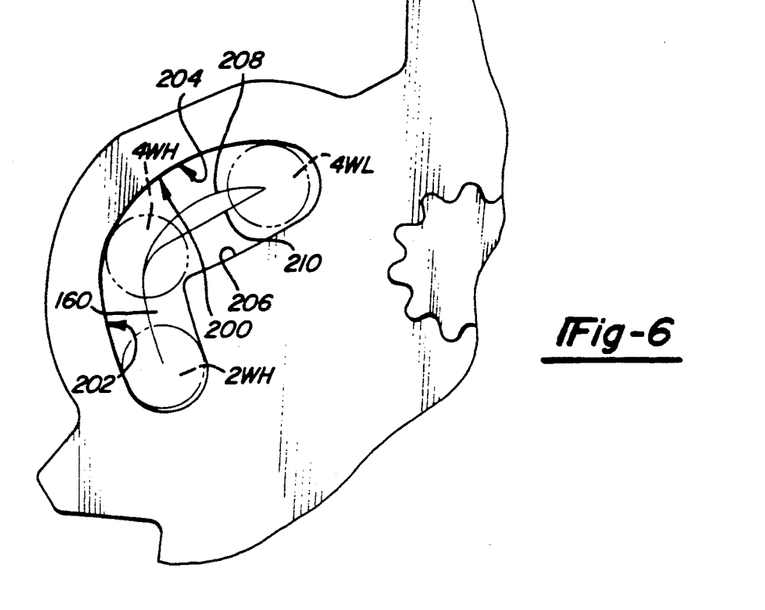
FIG. 6 is an enlarged partial view of the sector plate showing the two distinct uni-directional pathways associated with the "dual" cam track range section of the range slot in accordance with a preferred embodiment of the present invention.

In accordance with the principles of the present invention, the "dual" cam track profile associated with "range" section 200 of contoured range slot 160 has been uniquely configured to define two distinct edge or "camming" surfaces. More particularly, "range" section 200 is shown to include first and second camming surfaces 204 and 206, respectively, which are individually and distinctly contoured for "tracking" various phases of the 4WH-to-4WL and 4WL-to-4WH, respectively, range shifting process in a manner to be described in greater detail hereafter. Preferably, "range" section 200 of contoured range slot 160 is widened compared to "mode" section 202 such that an exaggerated amount of lateral clearance with range pin 162 is provided.

In general, the profile of first camming edge 204 is designed to exert maximum axial forces on range pin 160 upon rotation of sector plate 154 in a first direction (i.e. counterclockwise) when most needed while minimizing the axial forces exerted when least required for effectively optimizing Four-Wheel High-Range (4WH) to Four-Wheel Low-Range (4WL) shift effort characteristics. As graphically depicted in FIG. 7, Curve "A" illustrates the axial force versus range pin displacement characteristics associated with first camming surface 204 wherein the largest axial forces are initially developed to overcome drag forces associated with slidably disengaging range collar external splines 64 from sun gear internal spline teeth 66.

The profile of second camming edge 206 is designed to exert maximum axial forces on range pin 160 upon rotation of sector plate 154 in the second direction (i.e. clockwise) when most needed while minimizing axial forces exerted when least required for effectively optimizing Four-Wheel Low-Range (4WL) to Four-Wheel High-Range (4WH) shift effort. As seen in Curve "B" of FIG. 7, an axial force versus range pin displacement curve associated with second camming edge 206 includes two distinct portions. The first portion "$B_1$" is designed to provide the largest forces for slidably disengaging range collar external splines 64 from gear teeth 68 formed on aft carrier ring 42. The second portion "$B_2$" of Curve "B" provides increased forces for permitting smooth sliding engagement of range collar external splines 64 with sun gear internal spline teeth 66. As will be appreciated, Curves "A" and "B" are merely intended to exemplify the distinct axial force versus range pin displacement characteristics which can be readily produced with one embodiment of the present invention and in no way are intended to limit the scope or interpretation of the principles embodied therein.

As will now be appreciated, the specific profile or "contour" of each of first and second camming edges 204 and 206, respectively, are dissimilar and are selected to produce the desired uni-directional axial force characteristics with respect to the axial position of range pin 162. In this manner, the magnitude of the axial force exerted on range pin 162 at virtually any axial position thereof and in either direction of axial motion can be optimized to significantly reduce overall shift resistance. While first and second cam edges 204 and 206, respectively, have been shown as being arcuate, it is to be understood that non-arcuate surfaces, such as dissimilar non-parallel linear ramps may also be suitably incorporated into "range" section 200 of range slot 160.

Figure 7:
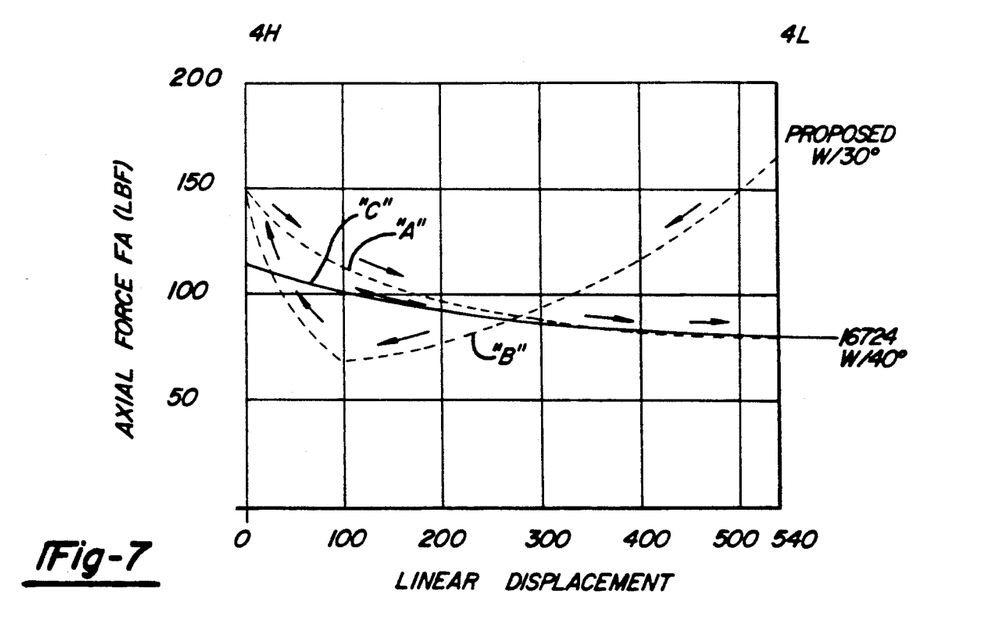
FIG. 7 is an exemplary graphical comparison of the axial force versus range pin displacement characteristics associated with the two distinct uni-directional pathways of FIG. 6 and a prior art sector plate having a common bi-directional pathway.

As previously noted, FIG. 7 graphically illustrates an exemplary comparison of the axial force versus range pin displacement characteristics associated with "range" section 200 of sector plate 154 with respect to a conventional sector plate having a range section defining a single bi-direction or "common" pathway. Moreover, plots "A" and "B" depict the unidirectional force curves associated with the dissimilar first and second camming edges 204 and 206, respectively, for sector plate 154 while plot "C" is indicative of the bi-directional force curve associated with the conventional sector plate.

As seen in FIGS. 3 through 5, sector plate 154 is provided with a notch 210 which opens a contact of a switch member 212 when transfer case 12 is shifted into the Two-Wheel drive mode. Upon rotation of sector plate 154 out of the Two-Wheel drive mode position, switch 212 is closed to complete a circuit which energizes a visual display indicating to the vehicle operator that the vehicle is in a Four-Wheel drive operating mode.

While a specific embodiment of the invention has been shown and described in detail to illustrate the principles of the present invention, it will be understood that the invention may be embodied in other forms without departing from such principles and the fair scope of the present invention.

What is claimed is:

1. A four-wheel drive transfer case comprising:
   a housing;
   an input shaft supported for rotation in said housing;
   an output shaft supported for rotation in said housing;
   speed reduction means for selectively interconnecting said input shaft to said output shaft to define a four-wheel High-range mode and a four-wheel Low-range mode;
   a shift member movable between a first position for shifting said speed reduction means into said High-range mode and a second position for shifting said speed reduction means into said Low-range mode; and
   cam means having a first pathway for moving said shift member to said first position in response to rotation of said cam means in a first direction, and a second pathway for moving said shift member to said second position in response to rotation of said cam means in a second direction, said first and second pathways having dissimilar surface profiles.

2. The transfer case of claim 1 wherein said shift member is a pin and said cam means includes a cam track such that said first pathway is a first edge surface thereof and said second pathway is a second edge surface thereof, said pin engaging said first edge surface upon rotation of said cam means in said first direction and engaging said second edge surface upon rotation of said cam means in said second direction.

3. The transfer case of claim 1 wherein said dissimilar surface profiles of said first and second pathways are laterally offset and non-parallel.

4. The transfer case of claim 3 wherein said dissimilar surface profiles of said first and second pathways are configured as arcuate surfaces each having a different radius.

5. A shift apparatus for shifting a transfer case between a High-Range operating mode and a Low-Range operating mode, said shift apparatus comprising:
   a plate supported within said transfer case for rotation about an axis, a pin member extending into a cam track formed in said plate, said cam track defining first camming means for moving said pin member and a shift fork to a first position corresponding to said transfer case High-Range operating mode in response to selective rotation of said plate in a first direction, said cam track defining second camming means for moving said pin member and said shift fork to a second position corresponding to said transfer case Low-Range operating mode in response to selective rotation of said plate in a second direction, said first and second camming means each having a dissimilar surface profile engageable with said pin member.

6. The shift apparatus of claim 5 wherein said first camming means is a first edge surface of said cam track configured to define a first uni-directional pathway that is operable to act on said pin member for moving said shift fork to said first position, and said second camming means is a second edge surface of said cam track configured to define a second uni-directional pathway that is operable to act on said pin member for moving said shift fork to said second position.

7. The shift apparatus of claim 6 wherein each of said first and second camming means is a generally arcuate surface that have a non-common radius and which are laterally offset to define a clearance with said pin member.

8. The shift apparatus of claim 6 wherein said first and second camming means are linear non-parallel surfaces.

9. The shift apparatus of claim 5 further comprising shift means coupled to said plate for selectively rotating said plate in said first and second directions under the control of a vehicle operator.

10. The shift apparatus of claim 9 wherein said first and second camming means of said cam track are each configured differently for causing distinct axial force versus pin member displacement characteristics to be generated upon a relatively constant input force being applied via said shift means.

11. The shift apparatus of claim 9 further comprising a second pin member biased into engagement with an outer edge surface of said plate, said second pin member adapted to move a second shift fork relative to said first shift fork for shifting said transfer case between a Two-Wheel drive mode and a Four-Wheel drive mode upon rotation of said plate when said first pin member is located within a portion of said cam track which defines a common pathway provided for maintaining said first pin member in said High-Range position.

12. The shift apparatus of claim 11 wherein said second shift fork is operatively coupled to said shift means for causing movement of a clutch sleeve between a first position wherein said clutch sleeve is disengaged from a chain carrier of said transfer case for defining said Two-Wheel drive mode and a second position wherein said clutch sleeve lockingly engages said chain carrier for shifting said transfer case into said Four-Wheel drive mode.

13. The shift apparatus of claim 12 wherein said transfer case includes an input shaft driven by an engine of a motor vehicle, a first output shaft adapted for driving connection to rear ground-engaging wheels of said motor vehicle and a second output shaft adapted for driving connection to front ground-engaging wheels of said motor vehicle, and wherein said second fork member is adapted to shift said clutch sleeve between said Two-Wheel drive mode position such that torque from said input shaft is transmitted only to said first output shaft, and said Four-Wheel drive mode position wherein torque is transmitted to both said first and second output shafts.

14. A shift apparatus including a sector plate rotatable about an axis to a plurality of positions and defining at least one cam track, and at least one pin member operatively associated with said one cam track and adapted to move an associated shift fork in response to selective bi-directional rotation of said sector plate between said positions, the improvement comprising:
said one cam track having a first camming surface and a second camming surface;
said one pin member being in contact with said first camming surface when said plate is rotated in a first direction and in contact with said second camming surface when said plate is rotated in a second direction, said first camming surface being dissimilar to said second camming surface such that engagement between said one pin member and said first camming surface defines a first uni-directional pathways and engagement between said one pin member and said second camming surface defines a second uni-directional pathway.

15. The shift apparatus of claim 14 wherein said first and second camming surfaces have non-parallel surface profiles configured to only engage said one pin-member in response to rotation of said sector plate in a corresponding direction.

16. The shift apparatus of claim 15 wherein said one pin member is adapted to move said shift fork to a first position in response to rotation of said sector plate in a first direction, and said one pin member is adapted to move said shift fork to a second position in response to rotation as said sector plate in a second direction.

17. The shift apparatus of claim 16 further comprising shift means coupled to said sector plate for selectively rotating said sector plate in said first and second directions under the control of a vehicle operator.

18. The shift apparatus of claim 17 wherein each of said first and second camming surfaces of said cam track have a different edge profile for causing distinct axial force versus pin member displacement characteristics to be generated upon a relatively constant input force being applied to said sector plate via said shift means.

19. The shift apparatus of claim 16 wherein said first and second camming surfaces define first and second generally arcuate edges, said first and second edges having a non-common radius and are laterally offset to define a clearance within which said one pin member travels.

20. The shift apparatus of claim 16 wherein said first and second camming surfaces are defined by linear non-parallel surfaces.

21. A transfer case comprising:
a housing;
a first shift fork moveable in said housing for shifting said transfer case into one of a High speed range and a Low speed range;
a second shift fork moveable in said housing for shifting said transfer case into one of a Two-Wheel drive mode and a Four-Wheel drive mode; and
a shift apparatus for selectively moving said first and second shift forks, said shift apparatus including a plate rotatable in said housing about an axis, said plate defining first and second cam tracks, first and second pin members operatively associated with said first and second cam tracks and drivingly connected to said first and second shift forks, respectively, said first cam track having a first edge surface and a second edge surface which are arranged such that said first pin member is only engageable with said first edge surface when said plate is rotated in a first direction for shifting said first shift fork toward said transfer case High speed range, said first pin member being only engageable with said second edge surface when said plate is rotated in a second direction for shifting said first shift fork toward said transfer case Low speed range, said first and second edge surfaces having different profiles for generating different forces that act on said first pin member for moving said first shift fork in response to the direction and amount of rotation of said plate.

22. The transfer case of claim 21 wherein said profile of said first edge surface defines a first uni-directional pathway that is operable to exert forces on said first pin member for moving said first shift fork to a position corresponding to said High speed range, and said profile of said second edge surface defining a second uni-directional pathway that is operable to exert forces on said first pin member for moving said first shift fork to a position corresponding to said Low speed range position.

23. The transfer case of claim 22 wherein said first and second edge surfaces are a generally arcuate surfaces each having a non-common radius and which are laterally offset to define a clearance with said first pin member.

24. The transfer case of claim 22 wherein said first and second edge surfaces are linear non-parallel surfaces.

25. A shift apparatus of the type used in a transfer case for moving a shift fork between a High-Range operating position and a Low-Range operating position, said shift apparatus comprising, a sector plate supported within said transfer case for rotation about an axis, a range pin member extending into a range slot formed in said sector plate, said range slot having a first section operable for positioning and retaining said shift fork in said High-Range position upon rotation of said sector plate about said axis between positions corresponding to a Two-Wheel drive mode position and a Four-Wheel drive mode position, said range slot further defining a second section operable to act on said range pin for moving said shift fork between said High-Range operating position and said Low-Range operating position in response to selective rotation of said sector plate, the improvement wherein said second section of said range slot has first and second camming surfaces with said first camming surface being operable for moving said range pin member and said shift fork toward said High-Range position upon rotation of said sector plate in a first direction, said second camming surface being adapted to move said range pin member and said shift fork toward said Low-Range position in response to rotation of said sector plate in an opposite second direction, whereby said first camming surface defines a first uni-directional pathway along which said range pin member travels and said second camming surface defines a second uni-directional pathway along which said range pin member travels.

26. The shift apparatus of claim 25 further comprising shift means coupled to said sector plate and operable for selectively rotating said sector plate under the control of a vehicle operator.

27. The shift apparatus of claim 26 wherein each of said first and second camming surfaces has a differently contoured edge profile for causing a variable range of axial forces to be exerted on said range pin member in response to a relatively constant input torque being applied to rotate said sector plate via said shift means.

* * * * *